(12) United States Patent
Naruoka et al.

(10) Patent No.: US 9,308,958 B2
(45) Date of Patent: Apr. 12, 2016

(54) ENGINE SUPPORT STRUCTURE IN MOTORCYCLE

(71) Applicant: Kawasaki Jukogyo Kabushiki Kaisha, Hyogo (JP)

(72) Inventors: Shohei Naruoka, Kakogawa (JP); Yoshiharu Matsuda, Akashi (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 0 days.

(21) Appl. No.: 14/524,865

(22) Filed: Oct. 27, 2014

(65) Prior Publication Data

US 2015/0136510 A1    May 21, 2015

(30) Foreign Application Priority Data

Nov. 15, 2013   (JP) ................................. 2013-236770

(51) Int. Cl.
*B62K 11/04* (2006.01)
*B62M 7/02* (2006.01)
*F02B 61/02* (2006.01)

(52) U.S. Cl.
CPC ................. *B62K 11/04* (2013.01); *B62M 7/02* (2013.01); *F02B 61/02* (2013.01)

(58) Field of Classification Search
CPC ........... B62K 11/04; B62M 7/01; F02B 61/02
USPC ....................................................... 180/219
See application file for complete search history.

(56) References Cited

U.S. PATENT DOCUMENTS

| 7,455,057 | B2* | 11/2008 | Hochmayr | F01M 13/0416 123/572 |
| 7,971,672 | B2* | 7/2011 | Kubo | B62K 11/04 180/219 |
| 8,322,479 | B2* | 12/2012 | Tani | B62J 23/00 180/219 |
| 2009/0277709 | A1* | 11/2009 | Morikawa | F01L 1/022 180/219 |
| 2011/0073398 | A1 | 3/2011 | Yokoyama et al. | |
| 2013/0153319 | A1 | 6/2013 | Kawano et al. | |

FOREIGN PATENT DOCUMENTS

EP    1 950 129    7/2008
JP    2001-071982    3/2001

OTHER PUBLICATIONS

European Application No. 14189902 Extended European Search Report dated Mar. 20, 2015, 5 pages.

(Continued)

*Primary Examiner* — Kevin Hurley

(57) ABSTRACT

A first main frame segment 62 extends rearwardly from a head pipe 4, a second main frame segment 64 pivotally supports a swingarm 12, and an engine casing EC is disposed between the head pipe 4 and the swingarm 12. The engine casing EC includes a crankcase section 28, a cylinder part 30, a cylinder head part 32 and a transmission casing section 34. The first main frame segment 64 includes a first mount portion 56, which is connected with a front portion of the cylinder part 30, and a second mount portion 58 which is connected with a rear portion of the cylinder head part 32. The second main frame segment 64 includes a third mount portion 60 which is connected with a rear portion of the transmission casing section 34.

10 Claims, 5 Drawing Sheets

(56) References Cited

OTHER PUBLICATIONS

Office Action dated Jan. 14, 2016 for corresponding Canada Patent Application 2,867,930 (4 pages).

Beeler, "Sneak Peak of the Motus MST-01", Asphalt & Rubber, http://www.asphaltandrubber.com/bikes/sneak-peak-motus-mst-01/, Nov. 11, 2010 (10 pages).

* cited by examiner

ENGINE SUPPORT STRUCTURE IN MOTORCYCLE

CROSS REFERENCE TO THE RELATED APPLICATION

This application is based on and claims Convention priority to Japanese patent application No. 2013-236770, filed Nov. 15, 2013, the entire disclosure of which is herein incorporated by reference as a part of this application.

BACKGROUND OF THE INVENTION

1. Field of the Invention

The present invention relates to an engine support structure in a motorcycle of a type in which a crankcase for supporting a crankshaft and a cylinder head protruding upwardly from a front portion of the crankcase are supported on a main frame extending rearwardly from a head pipe with respect to the forward traveling direction thereof.

2. Description of Related Art

The motorcycle generally has a main frame that extends rearwardly of a head pipe for the support of a front wheel and a swingarm for the support of a rear wheel, which swingarm is pivotally supported by a rear portion of the main frame. A motorcycle combustion engine is supported at, for example, three points including a lower rear portion, an upper rear portion and an upper front portion with respect to the direction of forward travel of the motorcycle as disclosed in, for example, the JP Laid-open Patent Publication No. 2001-071982.

In recent years, demands has been increasing to simplify the structure of and reduce the weight of the main frame employed in the motorcycle.

SUMMARY OF THE INVENTION

In view of the foregoing, the present invention has for its primary object to provide an engine support structure for and in a motorcycle capable of achieving a weight saving and a simplification of the main frame.

In order to accomplish the object of the present invention referred to above, the present invention provides an engine support structure for a motorcycle, which structure includes a first main frame segment extending rearwardly from a head pipe to support a front wheel, a second main frame segment to pivotally support a swingarm to support a rear wheel, and an engine casing interposed between the head pipe and the swingarm. In this engine support structure, the engine casing includes a crankcase section to support a crankshaft, a cylinder forming section protruding upwardly from a front portion of the crankcase section and a transmission casing section disposed rearwardly of the crankcase section. Also, the first main frame segment referred to above includes a first mount portion, which is connected with a front portion of the cylinder forming section, and a second mount portion which is connected with a rear portion of the cylinder forming section. The second main frame segment referred to above includes a third mount portion which is connected with a rear portion of the transmission casing section.

According to the present invention, a force transmitted rearwardly from the front wheel is transmitted from the head pipe to the engine casing through the first mount portion and the second mount portion and is subsequently transmitted rearwardly from the engine casing to the swingarm through the third mount portion. Similarly, a force transmitted forwardly from the rear wheel is transmitted from the second main frame segment to the engine casing through the third mount portion and is then transmitted forwardly from the engine casing to the head pipe through the first mount portion and the second mount portion. Thus, with the first main frame segment connected with the engine casing through the two mount portions which are spaced forwardly and rearwardly, the force can be easily transmitted between the head pipe and the engine casing in the forward and rearward direction. As a result, the engine casing can be used as a part of a motorcycle frame structure. Accordingly, the degree of freedom in designing the main frame increases and it is possible, for example, to reduce the rigidity of a frame assembly that connects between the first main frame segment and the second main frame segment or to eliminate the use thereof. As a result, reduction in weight of the main frame and simplification thereof can be realized.

In a preferred embodiment of the present invention, the second mount portion may be disposed above the first mount portion. In this case, the cylinder forming section preferably includes a cylinder part, which is disposed above the crankcase section, and a cylinder head part disposed above the cylinder part, and the first mount portion is connected with the cylinder part and the second mount portion is connected with the cylinder head part. According to these structural features, since the second mount portion is disposed upwardly of the first mount portion, it is possible to avoid an undesirable interference between an equipment, which is disposed rearwardly of the cylinder forming section and above the transmission casing, and the second mount portion. Also, it is possible to substantially equalize the length from the first mount portion to the head pipe with the length from the second mount portion to the head pipe, and therefore, the transmission of the force from the head pipe to the engine casing can be allowed to take place efficiently.

In another preferred embodiment of the present invention, the first mount portion may be connected with the cylinder forming section on one side below an exhaust port, in which case the second mount portion is connected with the cylinder forming section on one side where an air intake port is formed. In such case, the second mount portion is preferably connected with the cylinder forming section on an outer side of the air intake port at a position level with the air intake port. According to these structural feature, since the first and second mount portions are formed while keeping away from the exhaust port that is high in temperature, the reduction in rigidity of the mount portions resulting from the temperature rise can be suppressed.

In a further preferred embodiment of the present invention, the first and second mount portions may be each formed in a pair on left and right sides of the engine casing. According to this structural feature, since the transmission of the force between the head pipe and the engine casing takes place effectively, the engine casing can be easily utilized as a part (a rigidity member) of the frame.

In a still preferred embodiment of the present invention, the third mount portion may be formed at a plurality of sites spaced one above the other in an upward and downward direction. In this case, the plurality of the third mount portions are preferably formed in a pair in side-by-side relation in a leftward and rightward direction. According to these structural features, since the transmission of the force between the swingarm and the engine casing takes place effectively, it is easy to utilize the engine casing as a rigidity member.

In a yet further preferred embodiment of the present invention, the cylinder forming section may include a cylinder part, which is disposed upwardly of the crankcase section, and a cylinder head part which is disposed upwardly of the cylinder part, in which case the crankcase section and the cylinder part are formed integrally with each other by means of die forming. According to this structural feature, since a large sized crankcase, in which the crankcase section and the cylinder part are integrated together, are formed, the rigidity of the engine casing forming a part of the frame increases.

In a still yet further preferred embodiment of the present invention, the first main frame segment may include a lower first tube, an upper second tube, which are arranged in an upward and downward direction, and a connecting tube connecting the first tube and the second tube with each other, in which case the first mount portion is formed in a rear end of the first tube and the second mount portion is formed in a rear end of the second tube. According to this structural feature, since the first main frame segment is constituted by a tube frame, the reduction in weight can be realized while the rigidity of the main frame is secured.

According to another aspect of the present invention, there is also provided, in accordance with the present invention, a combustion engine for a motorcycle, which is disposed between a head pipe and a swingarm of the motorcycle and includes an engine casing adapted to be connected with a mount portion in a motorcycle frame structure. In the combustion engine referred to above, the engine casing includes a crankcase section to support a crankshaft, a cylinder forming section protruding upwardly from a front portion of the crankcase section, and a transmission casing section disposed rearwardly of the crankcase section. Also in the combustion engine referred to above, a first to-be-mounted portion is formed in a front portion of the cylinder forming section, a second to-be-mounted portion is formed in a rear portion of the cylinder forming section, and a third to-be-mounted portion is formed in a rear portion of the transmission casing section.

Any combination of at least two constructions, disclosed in the appended claims and/or the specification and/or the accompanying drawings, should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

A preferred embodiment of the present invention will now be described in detail with reference to the accompanying drawings, noting that the terms "left" and "right" used in the description in this specification are relative terms denoting respective position and/or directions relative to a motorcycle driver or motorcyclist maneuvering the motorcycle to travel forwards.

Figure 1:
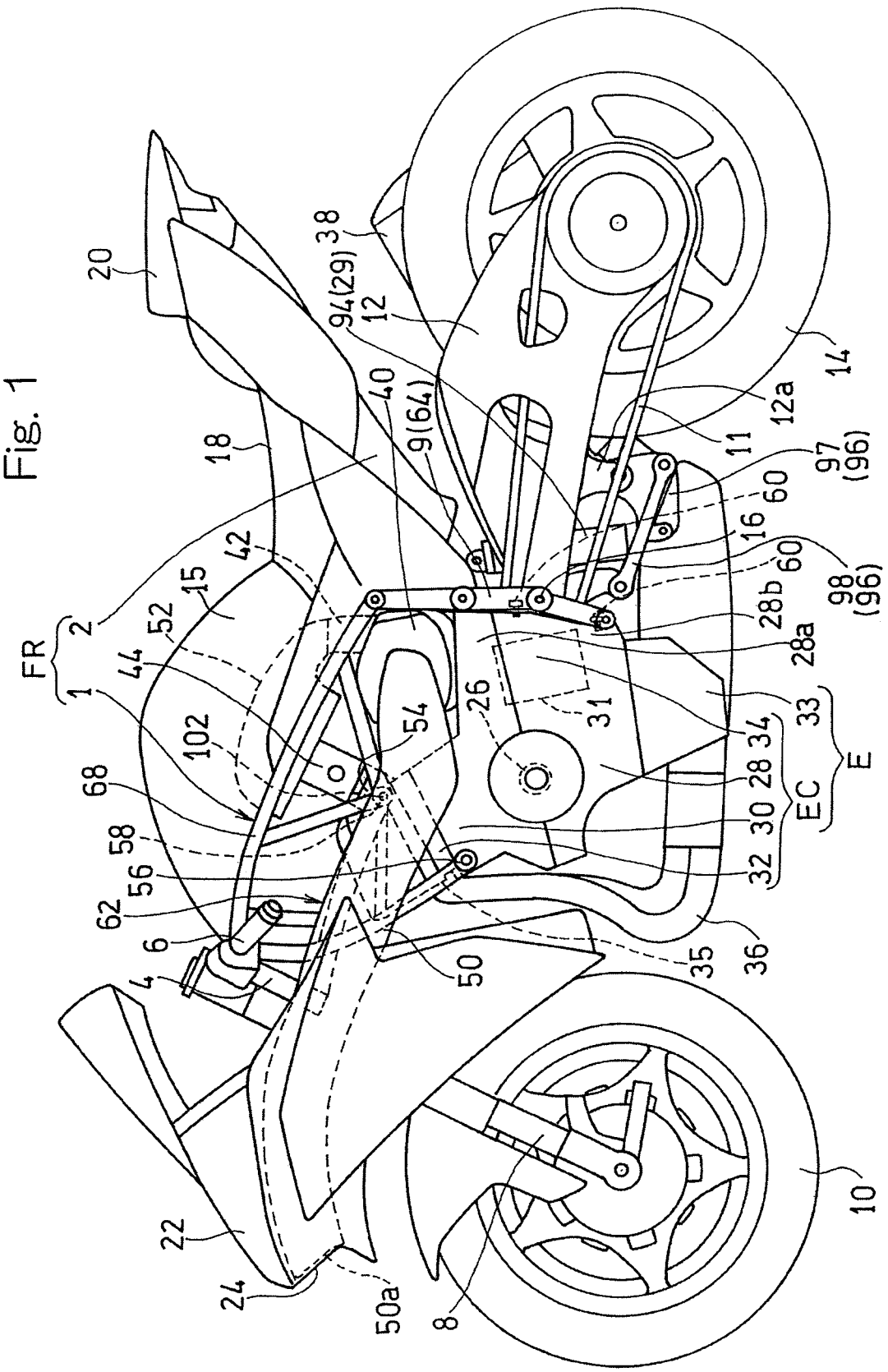
FIG. 1 is a side view showing a motorcycle equipped with an engine support structure designed in accordance with a preferred embodiment of the present invention.

FIG. 1 illustrates a left side view showing a motorcycle equipped with an engine support structure designed in accordance with a preferred embodiment of the present invention. As shown therein a motorcycle frame structure FR for the motorcycle includes a main frame 1, forming a front half of the motorcycle frame structure FR, and a rear frame 2 forming a rear half of the motorcycle frame structure FR. The main frame 1 has a front end provided with a head pipe 4, and a front fork 8 is rotatably supported by this head pipe 4 through a steering shaft (not shown). A steering handle 6 is fixed to an upper end portion of the front fork 8 and the front wheel 10 is fitted to a lower end portion of the front fork 8. In other words, the front wheel 10 is supported by the head pipe 4 through the front fork 8 and the steering shaft.

A swingarm bracket 9 is provided at a rear end portion of the main frame 1 which is a lower intermediate portion of the motorcycle frame structure FR. A swingarm 12 is supported for movement in up and down (vertical) direction about a pivot pin 16 fitted to the swingarm bracket 9. A rear wheel 14 is rotatably supported by a rear end portion of the swingarm 12.

A motorcycle combustion engine E is fitted to the lower intermediate portion of the motorcycle frame structure FR on a front side of the swingarm bracket 9. This combustion engine E drives the rear wheel 14 through a drive chain 11. The combustion engine E is in the form of a parallel multi-cylinder engine having a plurality of cylinders arranged in an axial direction of a crankshaft 26. In the practice of the embodiment now under discussion, a four cylinder, four cycle type engine is employed therefor. It is, however, to be noted that the type of engine that can be employed in the present invention is not necessarily limited to that described above.

The combustion engine E includes an engine casing EC, which forms the contour thereof, and an oil pan 33 connected at a location downwardly of the engine casing EC. The engine casing EC is positioned between the head pipe 4 and the swingarm 12 in a longitudinal direction or a forward and rearward direction and includes a crankcase section 28 which supports the crankshaft 26, a cylinder part 30 protruding upwardly from an upper surface of a front portion of the crankcase 28, a cylinder head part 32 above the cylinder part 30, and a transmission casing section 34 disposed rearwardly of the crankcase section 28 and accommodating therein a transmission 31. The engine casing EC is made of an aluminum alloy. The cylinder part 30 and the cylinder head part 32 cooperate with each other to define a cylinder forming section CY and the cylinder axial line of the cylinder forming section CY is inclined forwardly upwardly. In other words, the engine casing EC is, when viewed from side, so shaped as to represent a substantially L-shape.

In the illustrated embodiment, the crankcase section 28 is of a vertically split type made up of an upper half 28a and a lower half 28b and a rear portion of the crankcase section 28 concurrently serves as the transmission casing section 34. Also, the upper half 28a of the crankcase section 28 and the cylinder part 30 are integrally formed with each other by means of die forming.

The combustion engine E is connected with the main frame 1 at a first mount portion 56 thereof at a front portion of the cylinder part 30, a second mount portion 58 at a rear portion of the cylinder head part 32, and a third mount portion 60 at a rear portion of the transmission casing section 34. As described above, the first mount portion 56 and the second mount portion 58 are disposed respectively on both sides of a forward and rearward direction of the cylinder axial line and cooperate with each other to define a frame structure that sandwiches the cylinder. The details of the main frame 1 and each of the mount portions 56, 58 and 60 will be described later.

A rear suspension 29 is disposed rearwardly of the engine casing EC. The details of the rear suspension 29 will be described later. Four exhaust pipes 36 are fluid connected with four exhaust ports 35 in a front surface of the cylinder head part 32, respectively. Those four exhaust pipes 36 are merged together at a location beneath the combustion engine E and are then fluid connected with a muffler 38 disposed on a right side of the rear wheel 14.

A fuel tank 15 is disposed on an upper portion of the main frame 1 and a driver's seat 18 and a fellow passenger's seat 20 are supported by the rear frame 2. Also, a cowling 22 made of a resinous material is mounted on a front portion of the motorcycle frame structure FR. The cowling 22 covers a region ranging from an area forwardly of the head pipe 4 to opposite sides of an area forwardly of the engine E. This cowling 22 has an air intake opening 24 defined therein. This air intake opening 24 is positioned in a front end of the cowling 22 so that air to be supplied from the outside to the combustion engine E can be introduced therethrough.

An air intake duct 50 is disposed on a left side of the motorcycle frame structure FR. This air intake duct 50 is supported by the head pipe 4 in a fashion with a front end opening 50a confronting the air intake opening 24 in the cowling 22. Air drawn into the front end opening 50a in the air intake duct 50 has its pressure boosted by the ram effect.

An air cleaner 40 for purifying the ambient air and a supercharger 42 are disposed on an upper surface of the transmission casing section 34 at a location rearwardly of the cylinder part 30 and are lined in a direction widthwise of the motorcycle with the air cleaner 40 positioned on an outer side. The air intake duct 50 guides the incoming wind as an intake air towards the air cleaner 40 from an area forwardly of the combustion engine E and then through a left outer side of the cylinder part 30 and the cylinder head part 32. The supercharger 42 referred to above is operable to pressurize the purified air from the air cleaner 40 before it is supplied to the combustion engine E.

An intake air chamber 52 is positioned between the supercharger 42 and an intake port 54 of the combustion engine E, and the supercharger 42 and the intake air chamber 52 are fluid connected directly with each other. The intake air chamber 52 reserves a high pressure intake air supplied from the supercharger 42. A throttle body 44 is interposed between the intake air chamber 52 and the air intake port 54.

The intake air chamber 52 is disposed upwardly of the supercharger 42 and the throttle body 44. The fuel tank 15 referred to previously is disposed upwardly of the intake air chamber 52 and the throttle body 44.

Figure 2:
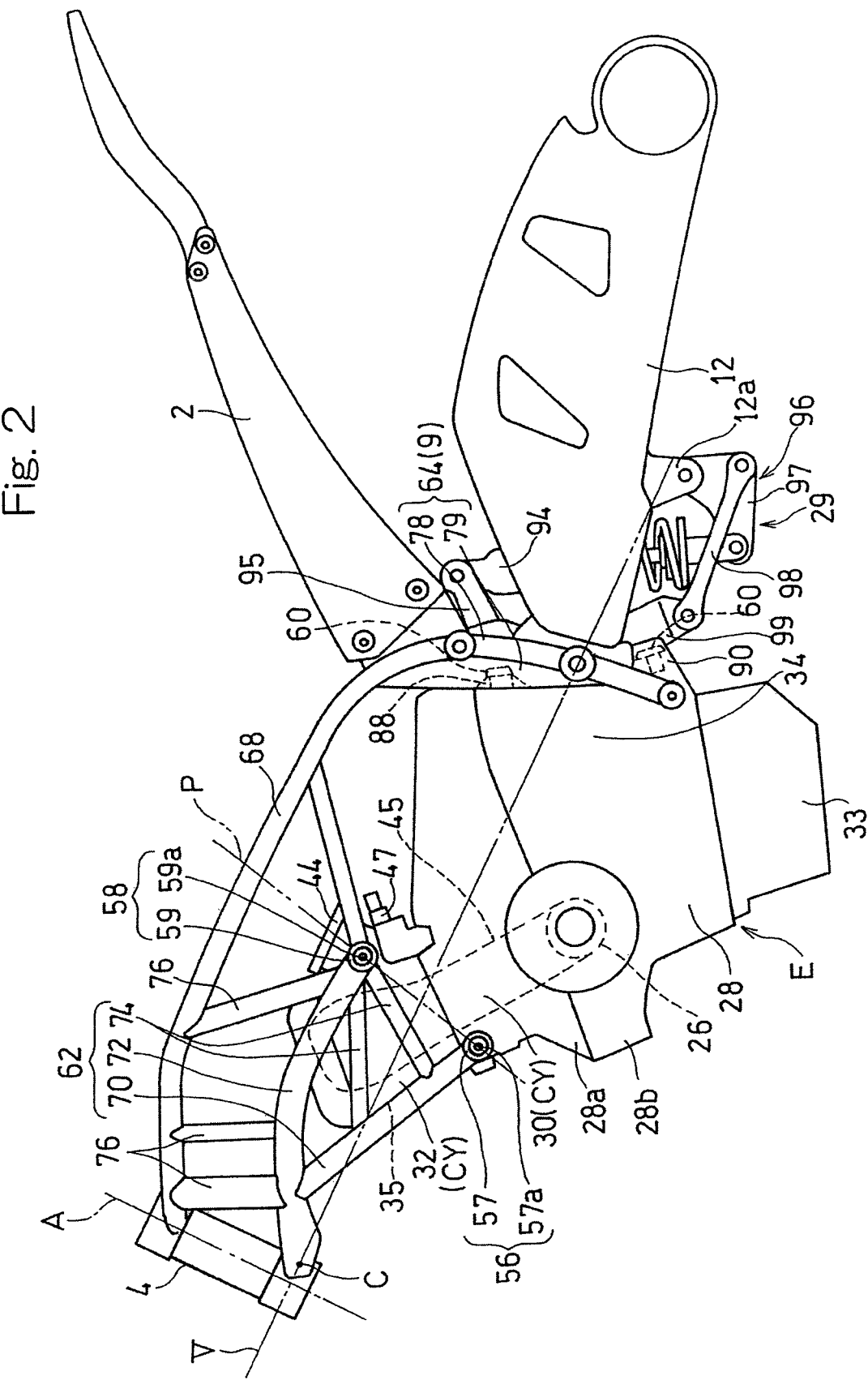
FIG. 2 a fragmentary side view showing, on an enlarged scale, an important portion of the motorcycle.

As shown in FIG. 2, a cam chain 45 for driving intake and exhaust valves is disposed on a right side of the combustion engine E, and a cam chain tensioner 47 for applying tension to the cam chain 45 is disposed at a location rearwardly of the cylinder head part 32 and on a right lateral side of the air intake port 54

Figure 3:
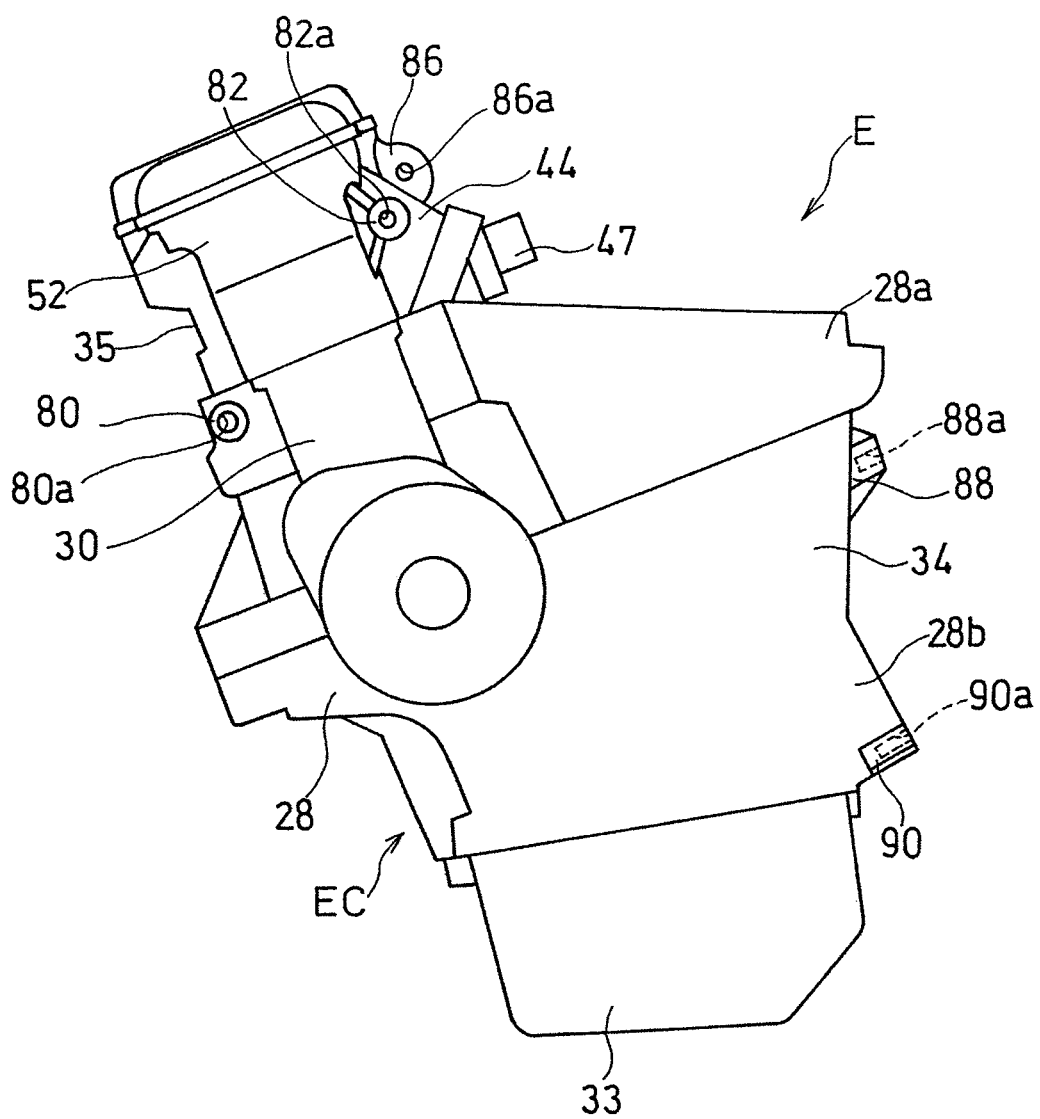
FIG. 3 is a side view showing a motorcycle combustion engine.

As shown in FIG. 3, a first boss 80 protruding laterally outwardly is formed integrally with the front portion of the cylinder part 30, and a first threaded hole 80a oriented in a leftward and rightward direction is formed in the first boss 80. The first boss 80 is formed in leftward and rightward side surfaces of the cylinder part 30. This first boss 80 forms a first to-be-mounted portion of the engine casing EC.

Also, a second boss 82 protruding laterally outwardly is integrally formed with a left rear portion of the cylinder head part 32, and a second threaded hole 82a, which is oriented in a leftward and rightward direction, is formed in this second boss 82 Specifically, the second boss 82 is formed integrally with a projection for defining the air intake port 44 at the rear portion of the cylinder head part 32. An engine mounting piece 86 protruding rearwardly is integrally provided at a location upwardly of the cam chain tensioner 47 at a right rear portion of the cylinder head part 32, and a bolt insertion hole 86a in the form of a throughhole oriented in the leftward and rightward direction is formed in the engine mounting piece 86. The second boss 82 and the engine mounting piece 86 cooperate with each other to define a second to-be-mounted portion of the engine casing EC.

Figure 4:
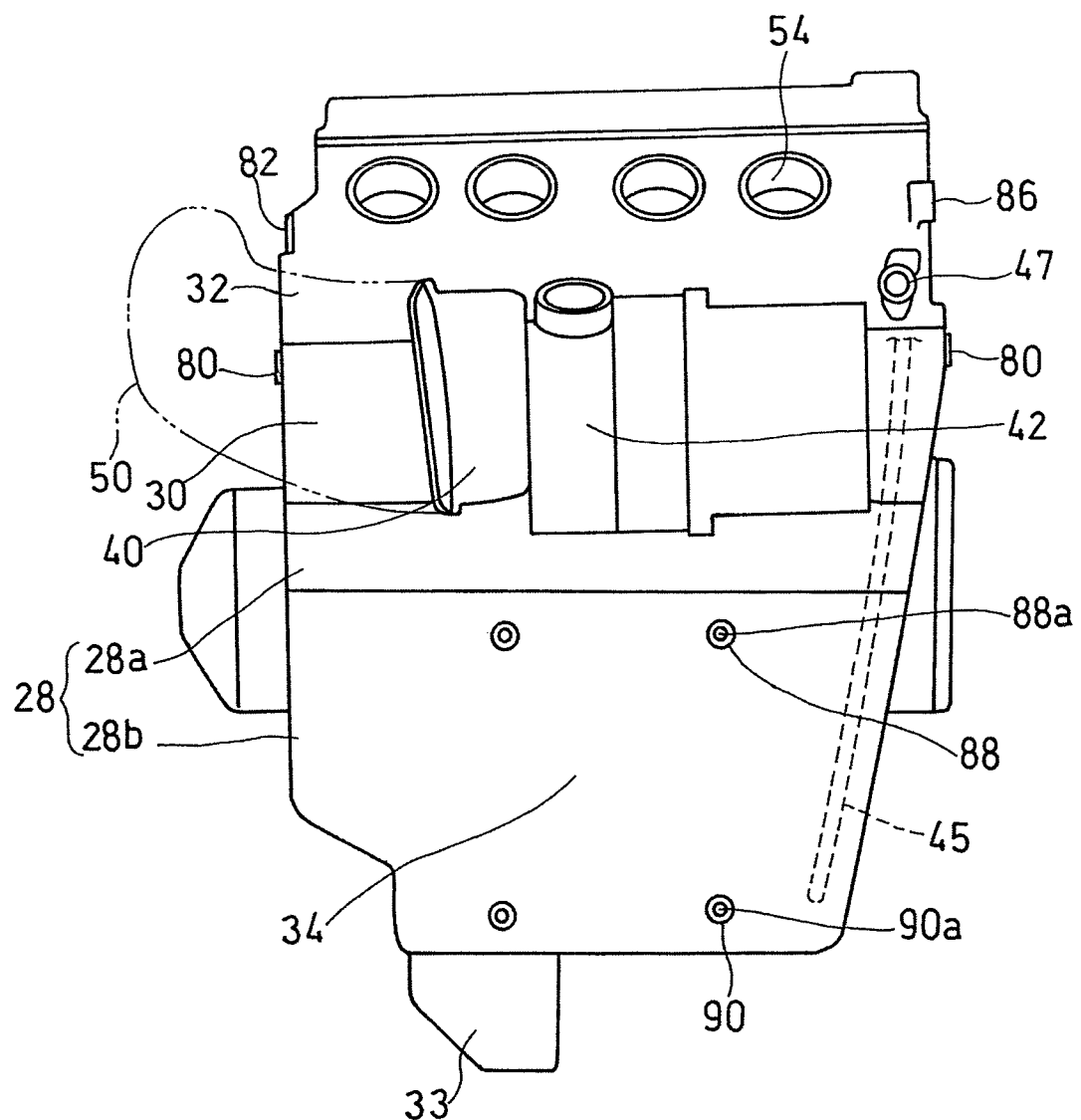
FIG. 4 is a back view showing a motorcycle combustion engine.

As shown in FIG. 4, a third boss 88 protruding rearwardly is formed integrally with a rear surface of the transmission casing section 34, specifically an upper area of a rear surface of the lower half 28b of the crankcase section 28, and a third threaded hole 88a oriented rearwardly is formed in this third boss 88. A fourth boss 90 is formed integrally with a lower portion of the rear surface of the lower half 28b of the crankcase section 28, and a fourth threaded hole 90a oriented rearwardly is formed in this fourth boss 90. Each of the third and fourth bosses 88 and 90 is formed in a pair so as to line up in the leftward and rightward direction. The third and fourth bosses 88 and 90 cooperate with each other to define a third to-be-mounted portion of the engine casing EC.

As shown in FIG. 2, the main frame 1 is a steel tube trellis frame comprised of a truss structure of steel tubes. This main frame 1 includes a first main frame segment 62, extending rearwardly from a lower portion of the head pipe 4, and a second main frame segment 64 for pivotally supporting the swingarm 12. In other words, the second main frame segment 64 forms the swingarm bracket 9 referred to previously.

The first main frame segment 62 includes a first tube 70, a second tube 72 and a connecting tube 74. The second tube 72 extends rearwardly from the lower portion of the head pipe 4, the first tube 70 is ramified from the second tube 72 so as to extend rearwardly and diagonally downwardly, and those first and second tubes 70 and 72 are connected with each other by the connecting tube 74. Although in the illustrated embodiment, the connecting tube 74 is employed in two in number, the number of the connecting tubes 74 may not be necessarily limited thereto. The head pipe 4 and each of the tubes 70, 72 and 74 are connected together by means of welding.

The second main frame segment 64 extends in the upward and downward direction at a position rearwardly of the combustion engine E and includes a pipe portion 78, which extends in the upward and downward direction, and a plate shaped bracket portion 78 secured to the pipe portion 78 by means of welding. This second main frame segment 64 is connected with the head pipe 4 through a third tube 68 which extends rearwardly and diagonally downwardly from an upper portion of the head pipe 4. The second tube 72 and the third tube 68 are connected with each other by means of a plurality of reinforcement tubes 76. Although in the illustrated embodiment the reinforcement tube 76 is employed four in number, the number of the reinforcement tubes 76 is not necessarily limited thereto. The head pipe 4, the second main frame segment 64 and each of those tubes 68 and 76 are connected by means of welding. The rear frame 2 referred to previously is connected with an upper portion of the second main frame segment 64.

The first mount portion 56 referred to previously is formed in a rear end (lower end) of the first tube 70, and the second mount portion 58 referred to previously is formed in a rear end of the second tube 72. Each of the first and second mount portions 56 and 58 is comprised of a cylindrical tube 57 or 59 of a kind having one end closed and also having its longitudinal axis extending in the leftward and rightward direction (in a direction widthwise of the motorcycle), and a corresponding bolt insertion hole 57a or 59a is formed in a bottom plate. The first tube 70 and the first mount portion 56 are connected with each other by means of welding and, similarly, the second tube 72 and the second mount portion 58 are connected with each other by means of welding.

Each of the first and second mount portions 56 and 58 on the first main frame segment 62 is formed in a pair on each left or right side portion of the engine casing EC. The left and right first mount portions 56 are connected respectively with the left and right first bosses 80 (best shown in FIG. 3) and the left second mount portion 58 and the right second mount portion 58 are connected respectively with the second boss 82 (best shown in FIG. 3) of the cylinder head part 32 and with the engine mounting piece 86 (also best shown in FIG. 3) of the cylinder head part 32.

More specifically, a bolt 100 (best shown in FIG. 1) is inserted from outside into the bolt insertion hole 57a in the first mount portion 56 and is then fastened into the first threaded hole 80a (best shown in FIG. 3) of the first boss 80 to thereby connect the first mount portion 56 and a front portion of the cylinder part 30 together.

Also, a bolt 102 (best shown in FIG. 1) is inserted from outside into the bolt insertion hole 59a in the left second mount portion 58 and is then fastened into the second threaded hole 82a in the second boss 82 to thereby connect the left second mount portion 58 and a rear portion of the cylinder head part 32 together. In addition, when a bolt (not shown) is inserted from outside through the bolt insertion hole 59a in the right second mount portion 58 and then through the bolt insertion hole 86a in the engine mounting piece 86 and a nut (not shown) is fastened thereto, the right second mount portion 58 and the rear portion of the cylinder head part 32 are connected together.

The second mount portion 58 is positioned upwardly of the first mount portion 56. Specifically, the first mount portion 56 is connected at a location in the cylinder part 30 which is lower in level than the exhaust port 35, and the second mount portion 58 is positioned at a level substantially in flush with a lower end of the head pipe 4. In other words, the second mount portion 58 is connected with an area outwardly of the air intake port 44 at a position substantially level with the air intake port 44.

Also, with respect to the imaginary line V connecting between a joint C with the second tube 72 in the head pipe 4 and the pivot pin 16, the first mount portion 56 and the second mount portion 58 are positioned at respective location below and upwardly. In addition, the distance from the imaginary line V to the first mount portion 56 and the distance from the imaginary line V to the second mount portion 58 are substantially equal to each other. Preferably, the first mount portion 56 and the second mount portion 58 are so formed that the plane P containing the first mount portion 56 and the second mount portion 58 may lie substantially parallel to a center axis (the longitudinal axis) A of the head pipe 4.

The third mount portion 60 is formed in the second main frame segment 64. This third mount portion 60 is formed in a pair on each left or right side at two locations spaced one above the other in the upward and downward direction. The upper third mount portion 60 is connected with the third boss 88, provided in a rear portion of the transmission casing section 34, and the lower third mount portion 60 is connected with the fourth boss 90 in the transmission casing section 34.

Figure 5:
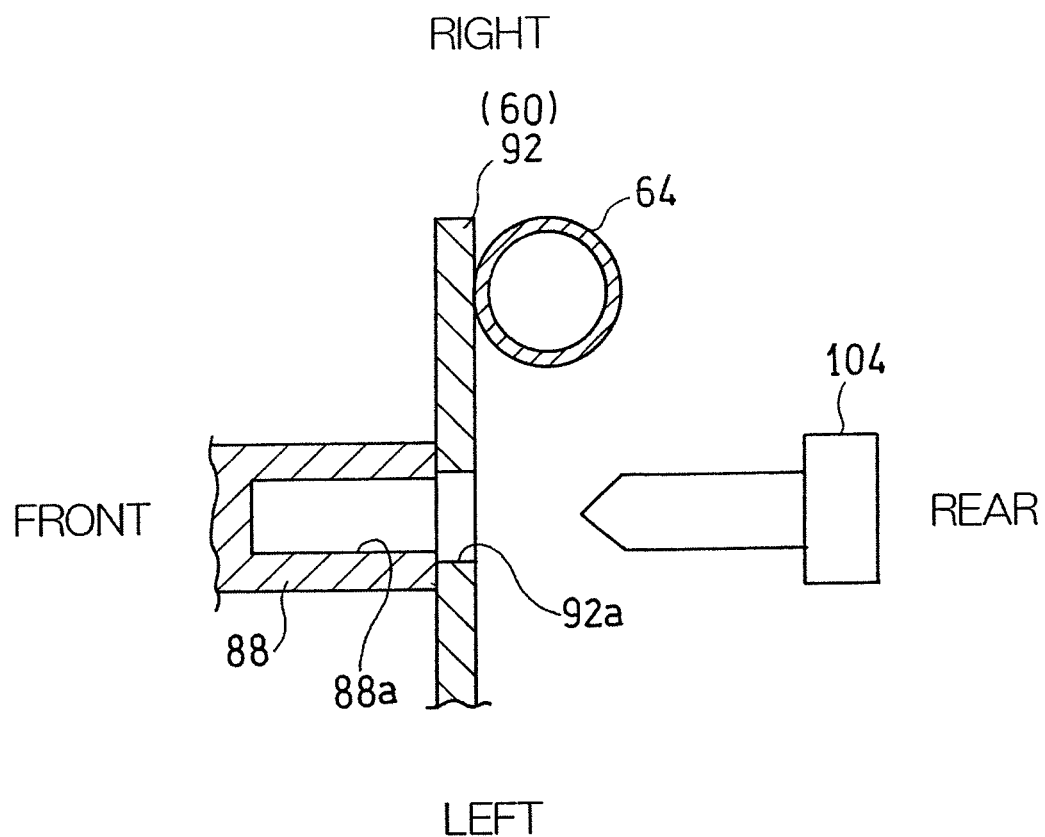
FIG. 5 is a sectional side view showing a third mount part of the engine support structure.

More specifically, as shown in FIG. 5, a plate shaped member 92 extending in the leftward and rightward direction is secured by welding to the second main frame segment 64, and a throughhole 92a oriented in the forward and rearward direction is formed in this plate shaped member 92. This plate shaped member 92 forms the upper third mount portion 60. A bolt 104 is inserted from rear into the throughhole 92a in this third mount portion 60 and is then fastened into the third threaded hole 88a of the third boss 88 in the transmission casing section 34. The lower third mount portion 60 is of a structure similar to the above described upper third mount portion 60. By so doing, the third mount portion 60 is connected with the rear portion of the transmission casing section 34. Although in the illustrated embodiment the upper and lower third mount portions 60 and 60 are constituted by a single plate shaped member 92, separate members may be employed for the upper and lower third mount portions 60 and 60.

As shown in FIG. 2, the rear suspension 29 referred to previously includes a shock absorbing body 94 that extends in the upward and downward direction, and an upper end of the shock absorbing body 94 is connected with the second main frame segment 64 through a bracket 95 and a lower end thereof is connected with the engine casing EC and the swingarm 12 through a link mechanism 96. The shock absorbing body 94 includes, for example, a spring and a shock absorber.

Specifically, the lower end of the shock absorbing body 94 is connected with a mounting piece 12a of the swingarm 12 through a first link member 97 in the form of a plate, and the first link member 97 is in turn connected with an engine bracket 99, which supports a rear portion of the engine casing EC, through a second link member 98 that extends in the forward and rearward direction. The shock absorbing body 94, the first link member 97 and the second link member 98 cooperate with each other to define the link mechanism 96 referred to above. It is, however, to be noted that in the illustrated embodiment, the plate shaped member 92 and the engine bracket 99 are integrally formed with each other.

In the construction hereinabove described, a force transmitted rearwardly from the front wheel 10 shown in FIG. 1 is transmitted from the head pipe 4 to the engine casing EC through the main frame segment 62, the first mount portion 56 and the second mount portion 58 and is thereafter transmitted rearwardly from the rear portion of the engine casing EC to the swingarm 12 through the third mount portion 60. Similarly, a force transmitted forwardly from the rear wheel 14 is transmitted from the second main frame segment 64 to the engine casing EC through the third mount portion 60 and is thereafter transmitted forwardly from the engine casing EC to the head pipe 4 through the first and second mount portions 56 and 58 and then through the first main frame segment 62.

With the first main frame segment 62 connected with the engine casing EC through the forwardly and rearwardly spaced two mount portions 56 and 58 as hereinbefore described, the distance between the mount portions 56 and 58 is increased enough to allow the combustion engine E to be stably supported and, also, transmission of the force between the head pipe 4 and the engine casing EC takes place efficiently. In other words, the engine casing EC can be utilized as a part (rigidity member) of the motorcycle frame structure FR. Accordingly, the rigidity of the third tube 68 can be lowered, or the use of the third tube 68 can be dispensed with. As a result, the main frame 1 can have a reduced weight and a simplified structure.

Since the cylinder part 30 and the cylinder head part 32 are inclined forwards, the cylinder part 30 and the cylinder head part 32 are allowed to extend from the crankcase section 28 towards the head pipe 4 and, hence, the first main frame segment 62 can be shortened. Also, since the distance from the imaginary line V, shown in FIG. 2, to the first mount portion 56 and that to the second mount portion 58 are substantially equal to each other, transmission of the force from the head pipe 4 to the engine casing EC takes place efficiently.

The rear suspension 29 is also connected with the engine casing EC (the transmission casing section 34) through the link mechanism 96 and the engine bracket 99 and, accordingly, the force from the rear suspension 29 is also transmitted to the engine casing EC. Since this rear suspension 29 is connected with the transmission casing section 34 through the engine bracket 99 which is integrally formed with the third mount portion 60 (the plate shaped member 92), the force from the rear wheel 14 and the force from the rear suspension 29 are transmitted to the transmission casing 34 through the plate shaped member 92. Accordingly, as compared with the direct connection of the third mount portion 60 and the rear suspension 29 with the transmission casing section 34, the degree of freedom of the shape of the transmission casing section 34 can be increased, and also there is no need to excessively increase the rigidity of the transmission casing section 34.

Also, the first mount portion 56 is connected with the cylinder part 30 and the second mount portion 58 is connected with the cylinder head part 32 thereabove and, therefore, any possible interference between the air intake duct 50, the air cleaner 40, the supercharger 42 and others, all of which are disposed rearwardly of the cylinder head part 32 shown in FIG. 1, with the second mount portion 58 can be avoided. Yet, the length from the first mount portion 56 to the head pipe 4 and the length from the second mount portion 58 to the head pipe 4 can be made substantially equal to each other and, therefore, the force from the head pipe 4 to the engine casing EC can be transmitted efficiently.

Moreover, since the first mount portion 56 is connected on one side beneath the exhaust port 35 and the second mount portion 58 is connected on an outer side of the air intake port 44 at a position level with the air intake port 44, it is possible to form the first and second mount portions 56 and 58 while keeping away from the exhaust port 35 tending to be heated to a substantial temperature and, hence, it is possible to avoid the reduction in rigidity of both of the mount portions 56 and 58 which would result from the temperature rise. Attention is called that even though the engine casing EC is made of a material, such as, for example, aluminum alloy, of a king susceptible to reduction in rigidity at elevated temperatures, the use of the mount portions 56 and 58 at such sites of relatively low temperature, respectively, is effective to suppress the undesirable reduction in rigidity of both of the mount portions 56 and 58.

Considering that each of the first and second mount portions 56 and 58 is formed in a pair on respective left and right sides of the engine casing EC, the transmission of the force between the head pipe 4 and the engine casing EC can be accomplished effectively. Accordingly, the engine casing EC can be easily utilized as a rigidity member.

The third mount portion 60 is formed at the two locations spaced one above the other in the upward and downward direction and is formed in one pair having been positioned one after another in the leftward and rightward direction. Accordingly, the transmission of the force between the swingarm 12 and the engine casing EC is accomplished effectively and, therefore, the engine casing EC can be easily utilized as a rigidity member.

Since the crankcase section 28 and the cylinder part 30 are formed integrally with each other by means of die forming, a large sized crankcase, in which the crankcase section 28 and the cylinder part 30 are integrated together, is constructed and, hence, the rigidity of the engine casing EC forming the rigidity member is increased.

In the practice of the present invention, the first main frame segment 62 has the first and second tubes 70 and 72, with the first mount portion 56 formed in the rear end of the first tube 70 and with the second mount portion 58 formed in the rear end of the second tube 72. Since the first main frame segment 62 is thus prepared from a pipe frame, the rigidity of the main frame 1 is secured and, at the same time, a further reduction in weight can be realized. Since the first mount portion 56 is connected with the cylinder part 30, the force acting on the cylinder head part 32 is reduced, as compared with connection with the cylinder head part 32. Hence, an undesirable deformation of the cylinder head part 32 can be avoided.

Since the second mount portion 58 on the left side is formed integrally with the projection for defining the air intake port 54, the rigidity increases. This second mount portion 58 on the left side is provided with the engine mounting piece 86 at a position spaced from the projection for forming the air intake port 54 towards a right side (outer side), and the bolt insertion hole (throughhole) 86a is formed in this engine mounting piece 86. Accordingly, the wall thickness of the mounting piece 86 can be suppressed. Since the cam chain 45 is disposed on the right side, the mount portion comes to be formed at the position spaced away from the air intake port 54 in the rightward direction or outwardly.

The first and second mount portions 56 and 58 are preferably so disposed that a tappet and a valve guide hole do not exist between a head bolt, used to connect the cylinder part 30 and the cylinder head part 32 with each other and each of those mount portions 56 and 58. By so doing, even through the cylinder part 30 is distorted by the action of a force from each of the mount portions 56 and 58, influences on the tappet and others can be minimized.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the foregoing preferred embodiment the first and second mount portions 56 and 58 have been shown and described as connected with the cylinder part 30 and the cylinder head part 32, respectively, the both of the mount portions 56 and 58 may be formed in the cylinder part 30. In particular, in the combustion engine E in which the cylinder part 30 and the crankcase section 28 are formed integrally, connection of the first and second mount portions 56 and 58 with the cylinder part 30 is effective to avoid an undesirable distortion of a cylinder bore and intake and exhaust ports.

Accordingly, such changes and modifications are, unless they depart from the scope of the present invention as delivered from the claims annexed hereto, to be construed as included therein.

REFERENCE NUMERALS

1 ... Main frame
4 ... Head pipe
10 ... Front wheel
12 ... Swingarm
14 ... Rear wheel
26 ... Crankshaft
28 ... Crankcase section
30 ... Cylinder part
32 ... Cylinder head part
34 ... Transmission casing section
35 ... Exhaust port
54 ... Air intake port
56 ... First mount portion
58 ... Second mount portion
60 ... Third mount portion
62 ... First main frame segment
64 ... Second main frame segment
70 ... First tube
72 ... Second tube
74 ... Connecting tube
80 ... First boss portion (First to-be-mounted portion)
82 ... Second boss portion (Second to-be-mounted portion)
86 ... Engine mounting piece (Second to-be-mounted portion)
88 ... Third boss portion (Third to-be-mounted portion)
90 ... Fourth boss portion (Third to-be-mounted portion)
CY ... Cylinder forming section
E ... Combustion engine
EC ... Engine casing

What is claimed is:

1. An engine support structure for a motorcycle, which comprises:
    a first main frame segment extending rearwardly from a head pipe to support a front wheel;
    a second main frame segment to pivotally support a swingarm to support a rear wheel; and
    an engine casing interposed between the head pipe and the swingarm;
    wherein the engine casing includes a crankcase section to support a crankshaft, a cylinder forming section protruding upwardly from a front portion of the crankcase section and a transmission casing section disposed rearwardly of the crankcase section;
    wherein the first main frame segment includes a first mount portion, which is connected with a front portion of the cylinder forming section, and a second mount portion which is connected with a rear portion of the cylinder forming section; and
    wherein the second main frame segment includes a third mount portion which is connected with a rear portion of the transmission casing section.

2. The engine support structure for the motorcycle as claimed in claim 1, wherein the second mount portion is disposed above the first mount portion.

3. The engine support structure for the motorcycle as claimed in claim 2, wherein the cylinder forming section includes a cylinder part, which is disposed above the crankcase section, and a cylinder head part disposed above the cylinder part, and
    wherein the first mount portion is connected with the cylinder part and the second mount portion is connected with the cylinder head part.

4. The engine support structure for the motorcycle as claimed in claim 1, wherein the first mount portion is connected with the cylinder forming section on one side below an exhaust port, and
    wherein the second mount portion is connected with the cylinder forming section on one side where an air intake port is formed.

5. The engine support structure for the motorcycle as claimed in claim 4, wherein the second mount portion is connected with the cylinder forming section on an outer side of the air intake port at a position level with the air intake port.

6. The engine support structure for the motorcycle as claimed in claim 1, wherein the first and second mount portions are each formed in a pair on left and right sides of the engine casing.

7. The engine support structure for the motorcycle as claimed in claim 1, wherein the third mount portion is formed at a plurality of sites spaced one above the other in an upward and downward direction.

8. The engine support structure for the motorcycle as claimed in claim 7, wherein the plurality of the third mount portions are formed in a pair in side-by-side relation in a leftward and rightward direction.

9. The engine support structure for the motorcycle as claimed in claim 1, wherein the cylinder forming section includes a cylinder part, which is disposed upwardly of the crankcase section, and a cylinder head part which is disposed upwardly of the cylinder part, and
    wherein the crankcase section and the cylinder part are formed integrally with each other by means of die forming.

10. The engine support structure for the motorcycle as claimed in claim 1, wherein the first main frame segment includes a lower first tube, an upper second tube, which are arranged in an upward and downward direction, and a connecting tube connecting the first tube and the second tube with each other, and
    wherein the first mount portion is formed in a rear end of the first tube and the second mount portion is formed in a rear end of the second tube.

* * * * *